(12) United States Patent
Garman

(10) Patent No.: US 7,350,792 B1
(45) Date of Patent: Apr. 1, 2008

(54) AUTOMOTIVE STEERING AND SUSPENSION SYSTEM

(76) Inventor: Gary T. Garman, 2541 Second St., La Verne, CA (US) 91750

( * ) Notice: Subject to any disclaimer, the term of this patent is extended or adjusted under 35 U.S.C. 154(b) by 0 days.

(21) Appl. No.: 10/764,594

(22) Filed: Jan. 26, 2004

(51) Int. Cl.
B62D 7/16 (2006.01)

(52) U.S. Cl. .............................. 280/93.51; 280/93.502; 280/93.507; 280/93.512; 280/124.11

(58) Field of Classification Search ............ 280/93.51, 280/93.512, 93.502, 93.507, 93.508, 93.509, 280/124.11, 124.116, 124.128, 124.132
See application file for complete search history.

(56) References Cited

U.S. PATENT DOCUMENTS

| | | | | |
|---|---|---|---|---|
| 2,669,315 A | * | 2/1954 | Butterfield | ................. 180/345 |
| 4,336,953 A | * | 6/1982 | Low | ...................... 280/93.508 |
| 5,458,359 A | * | 10/1995 | Brandt | ................. 280/124.111 |
| 5,711,544 A | * | 1/1998 | Buhl | ................... 280/124.116 |
| 6,267,526 B1 | * | 7/2001 | McLaughlin | ................ 403/150 |
| 6,752,403 B2 | * | 6/2004 | Allen et al. | ............. 280/6.157 |

FOREIGN PATENT DOCUMENTS

DE 3725102 * 2/1989 .......... 280/124.116

* cited by examiner

Primary Examiner—Eric Culbreth
(74) Attorney, Agent, or Firm—Henry M. Bissell; Henry M. Bissell, IV

(57) ABSTRACT

A system of linkages for a beam-type straight axle drive arrangement which accurately control the vehicle steering as well as axle location throughout its full range of suspension compression. This system can be retrofitted onto existing vehicles as a "bolt-on" retrofit kit, thereby dramatically improving the handling characteristics of such vehicles.

9 Claims, 5 Drawing Sheets

AUTOMOTIVE STEERING AND SUSPENSION SYSTEM

BACKGROUND OF THE INVENTION

1. Field of the Invention

The present invention generally relates to automotive drive systems and, more particularly, to such drive systems of the beam-type straight axle type.

2. Description of the Related Art

Beam-type straight axle drive systems have been and still are commonly used for many different automotive applications. While simple in design, these axle types also tend to be inexpensive and very durable, making them highly desirable on utility vehicles such as pickup trucks and sport utility vehicles (SUVs) which are equipped with 4-wheel drive or, at least, power transmission to the front wheels.

Many types of mounting and/or suspension methods have been used to attach straight axles to vehicles. Such methods include leaf springs, radius arms with coil springs, multi-link systems with coil springs, or a combination of any of the above. Probably the most compliant and well-functioning method of mounting/suspending a straight axle to a vehicle is the multi-link system in combination with coil springs. Vehicles such as the Jeep Cherokee (XJ Model), Jeep Comanche (MJ Model), Jeep Grand Cherokee (ZJ and WJ Models), Jeep Wrangler (TJ Model), and Dodge 4×4 pickup trucks have all used this type of system with reasonable success.

The multi-link system of locating a beam-type straight axle commonly utilizes five different links: two upper suspension arms, two lower suspension arms, and one track bar (see FIG. 1). The combination of these links enables the axle to move and articulate rather freely, while still providing a relatively stable platform for the vehicle to be suspended on.

Additionally, the steering system commonly utilized with this type of suspension system is the Y-type linkage (see FIG. 1). This system consists of a steering drag link running from the steering box pitman arm to the opposite steering knuckle, and a steering tie rod which attaches somewhere along the length of the steering drag link and on the opposite end to the remaining steering knuckle.

There are substantial problems with these types of suspension and steering systems. First, suspension compression results in axle translation, thus causing the vehicle to experience bump-induced yaw. When the vehicle hits a bump in the road, the suspension system will absorb this bump by allowing the axle to travel upward closer to the vehicle frame (see FIG. 2). As this happens, the track bar forces the axle toward the side of the vehicle opposite where the track rod attaches to the vehicle frame or body structure. This translation in axle location actually causes the vehicle body to move in the opposite direction (as the tires and wheels are mounted to the axle, and they will stay planted on the road surface), which is bump-induced yaw. This phenomenon creates a very unstable feel in the vehicle, possibly leading to loss of vehicle control. The problem is only exacerbated when the vehicle experiences increased suspension compression, such as during use in rough terrain.

Another significant problem lies with the Y-type steering linkage. As suspension compresses, the linkage changes its effective length, thus causing a toe-out situation with the tires. When the vehicle hits a bump in the road and the suspension compresses, the steering drag link and steering tie rod change relationship relative to one another (see FIG. 3). They become more parallel to one another during suspension compression, thus increasing the effective distance between the steering knuckles and thereby increasing toe-out on the vehicle (bump-induced toe change). Toe-out tends to make a vehicle "wander" or "hunt" around on the road, or in other words become unstable.

Jeep has somewhat resolved the bump-induced toe change problem on its later-model vehicles (WJ) by attaching the steering tie rod directly to both steering knuckles, rather than one steering knuckle and the steering drag link. However, there still remains an inherent problem with bump-induced steering, or bumpsteer. Referring to FIG. 1, it will be noted that the endpoints of the track rod do not coincide exactly with the endpoints of the steering drag link. As the vehicle hits a bump and the suspension compresses, these two linkage units move through somewhat different arcs. As the axle translates a given distance through a given amount of suspension compression, the steering knuckle translates a different amount. Thus, the vehicle will experience some amount of steering movement due solely to hitting the bump, which is bumpsteer.

Combining these three different issues together can cause a vehicle to handle very poorly during suspension compression, possibly leading to loss of vehicle control. A method of solving these problems is highly desirable for people who own or plan to own any vehicle utilizing these suspension and steering systems.

SUMMARY OF THE INVENTION

In brief, particular arrangements of the present invention comprise a system of linkages which accurately control the vehicle steering as well as locate the axle throughout its full range of motion in a vertical plane when experiencing suspension compression. This system can be retrofit onto existing vehicles as a "bolt-on" improvement kit, thereby drastically improving the handling characteristics of such vehicles.

In one particular arrangement of the present invention, a pair of upper suspension arms, one connected to each front wheel, are secured together to a central tie point, thereby forming a "wishbone". The central tie point is attached to a frame member which attaches to the axle. This wishbone suspension and the associated steering linkage permit control of axle location in all axes while preventing any translation due to suspension compression, as is demonstrated in FIG. 2.

In another particular arrangement in accordance with the invention, the two upper suspension arms extend from the wheel mounting points to a pair of separate points fastened to the central plate which is attached to the axle, thereby providing the same effect as the wishbone of FIG. 4 with dual connecting points for the inner ends of the upper suspension arms. As with the first-mentioned embodiment, this arrangement also serves to control axle travel in all axes while preventing axle translation due to axle suspension compression.

BRIEF DESCRIPTION OF THE DRAWINGS

A better understanding of the present invention may be realized from a consideration of the following detailed description, taken in conjunction with the accompanying drawings, in which.

DESCRIPTION OF THE PREFERRED EMBODIMENTS

Figure 1:
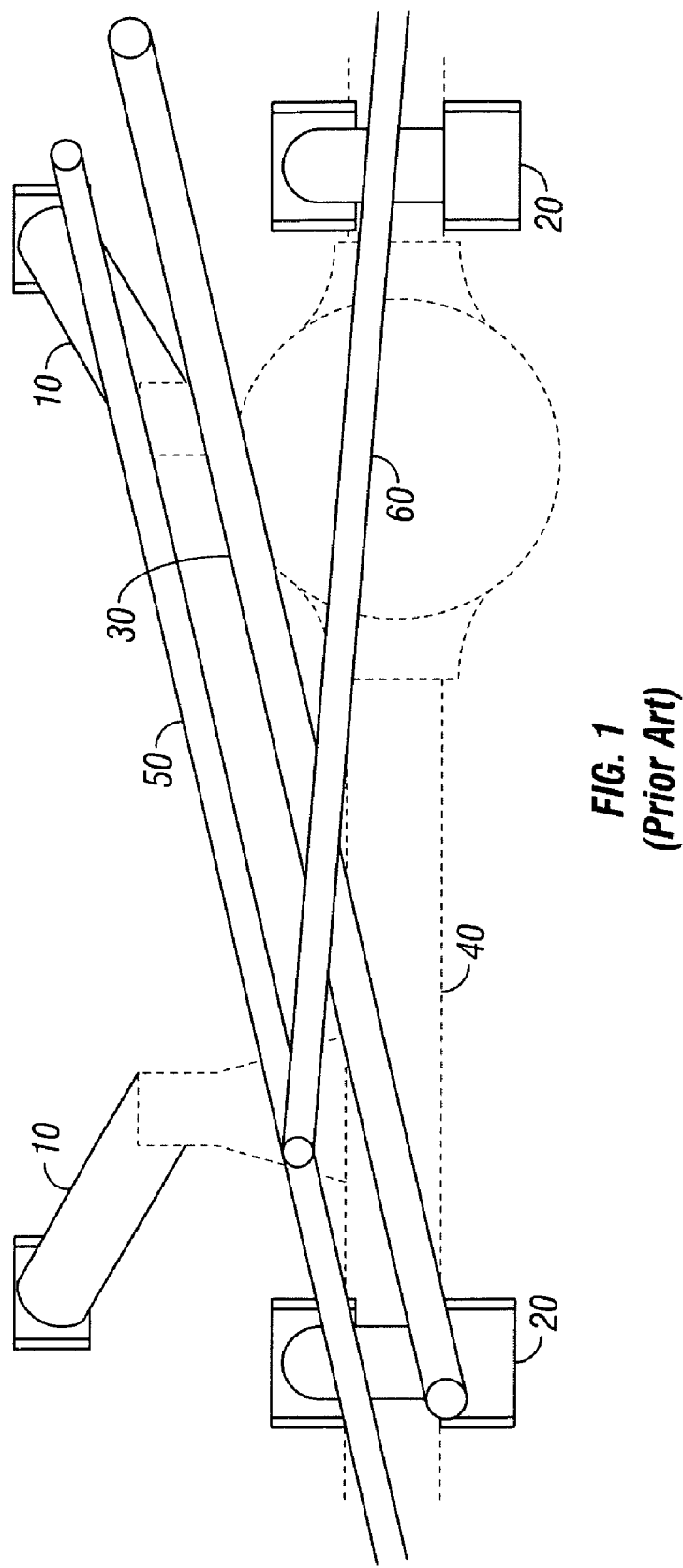
FIG. 1 is an end elevational view of a conventional Y-type multi-link suspension and steering system for locating a beam-type straight axle.
Figure 2:
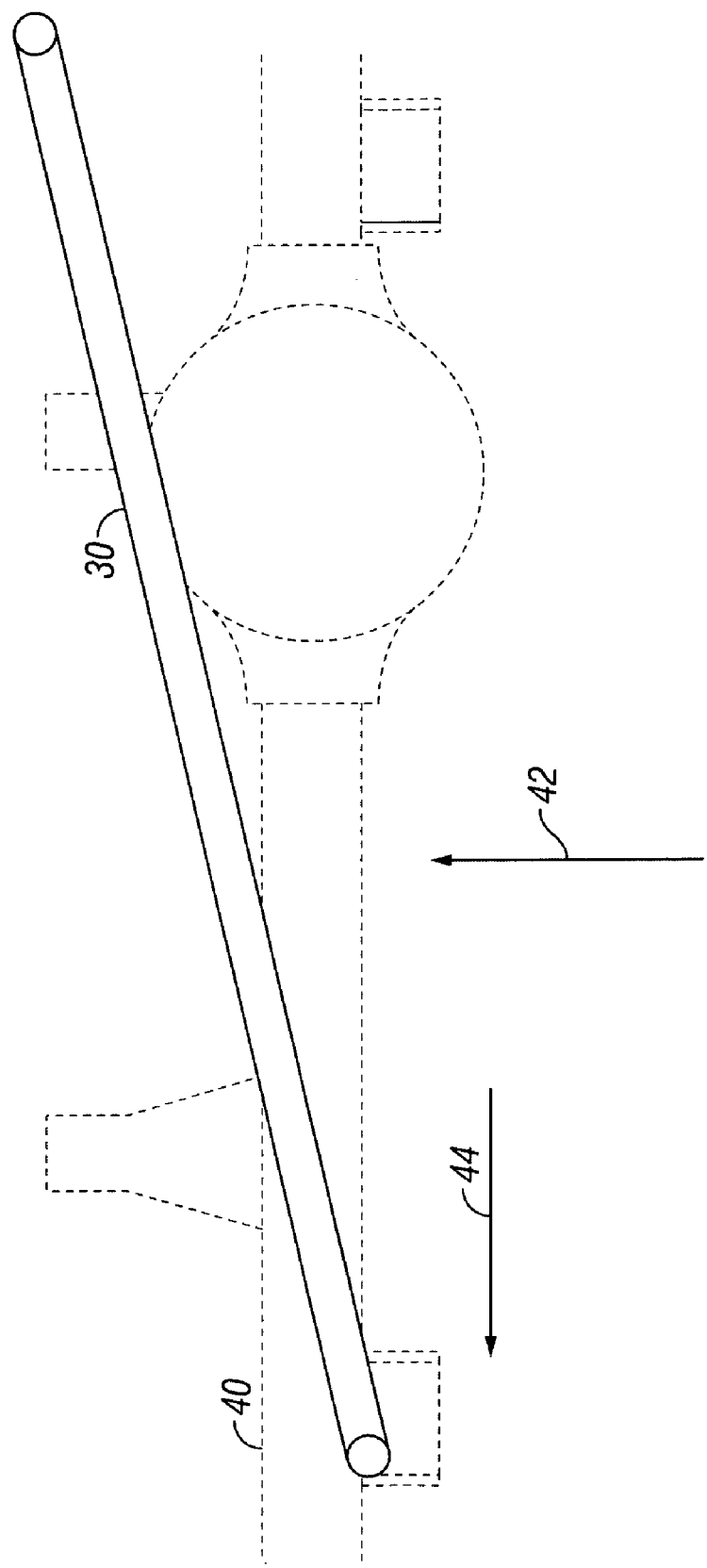
FIG. 2 is an end elevational view of the system of FIG. 1 showing the effects of suspension compression resulting in axle translation causing bump-induced yaw.
Figure 3:
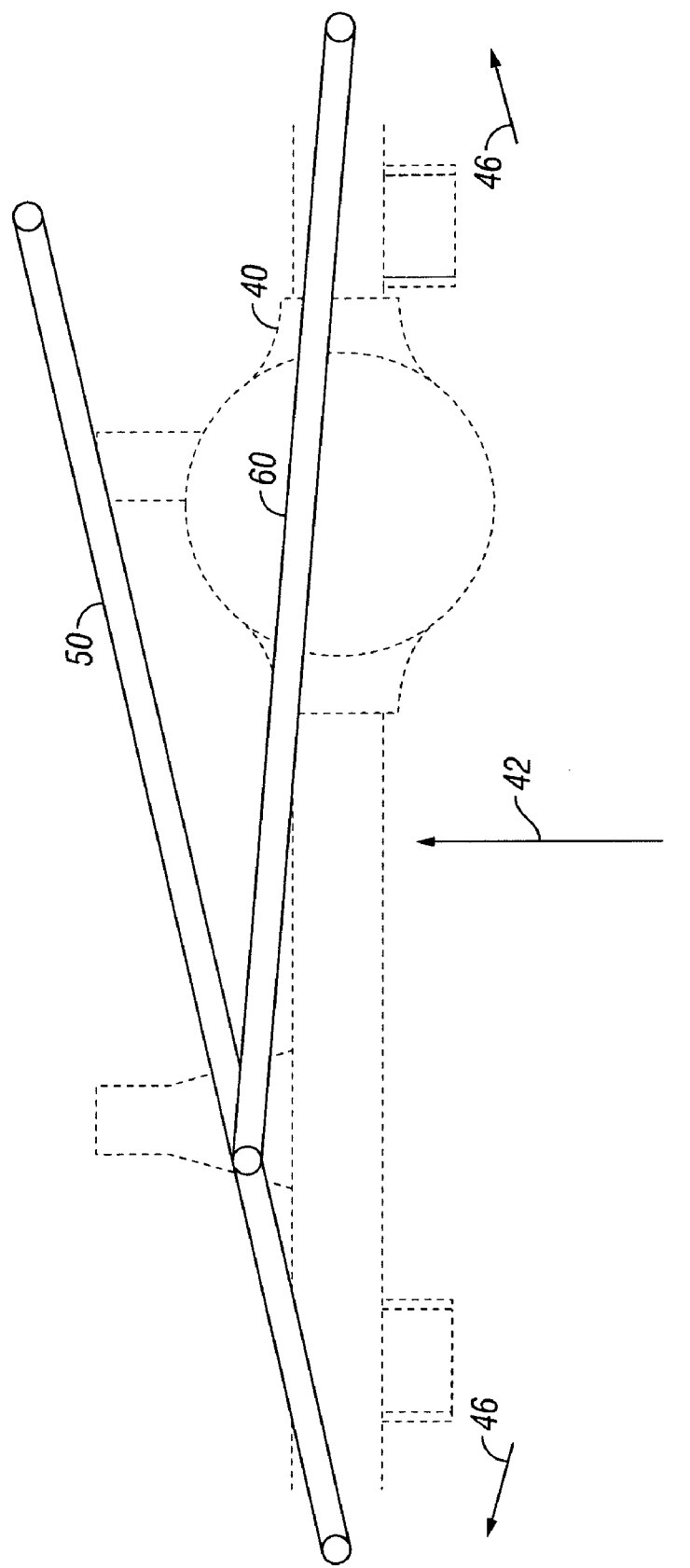
FIG. 3 is an end elevational view of the system of FIG. 1 showing increased toe-out of vehicle front wheels resulting from suspension compression.

Referring to FIGS. 1-3, a common configuration of utility vehicle suspension and steering is shown. Any left and right references are used as a matter of convenience and are determined by standing at the rear of the vehicle and facing forwardly in the direction of travel.

As depicted in FIG. 1, the multi-link system of locating a beam-type straight axle, as known in the prior art, commonly utilizes five different links: two upper suspension arms 10, two lower suspension arms 20, and one track rod 30. The combination of these links interconnected in the manner shown in the drawing enables the axle 40 to move and articulate rather freely, while still providing a relatively stable platform for the vehicle to be suspended on.

FIG. 1 also depicts a steering system commonly utilized with this type of suspension system, known as the Y-type linkage. This system consists of a steering drag link 50 running from the steering box pitman arm (not shown) to the opposite steering knuckle (not shown), and a steering tie rod 60 which attaches somewhere along the length of the steering drag link 50 and on the opposite end to the remaining steering knuckle (not shown).

FIG. 2 depicts the problems presented by commonly existing types of suspension and steering systems when the vehicle hits a bump in the road. The suspension system will compress to absorb the bump by allowing the axle 40 to travel upwards and closer to the vehicle frame (in the direction of the arrow 42). As this happens, the track bar 30 forces the axle 40 toward the side of the vehicle opposite where the track bar 30 attaches to the vehicle frame (to the left in FIG. 2, represented by the arrow 44). This translation in axle location causes the vehicle to move in the opposite direction, thereby creating bump-induced yaw.

FIG. 3 depicts another problem presented by the existing Y-type steering linkage when the vehicle hits a bump in the road. As the suspension system compresses (arrow 42) to absorb the bump, the steering drag link 50 and steering tie rod 60 change position relative to one another, becoming more parallel. This increases the effective distance between the steering knuckles (not shown) at the ends of steering drag link 50 and steering tie rod 60 and therefore increases toe-out on the vehicle (represented by the arrows 46). These changes in vehicle orientation on bumpy terrain contribute to vehicle instability.

Figure 4:
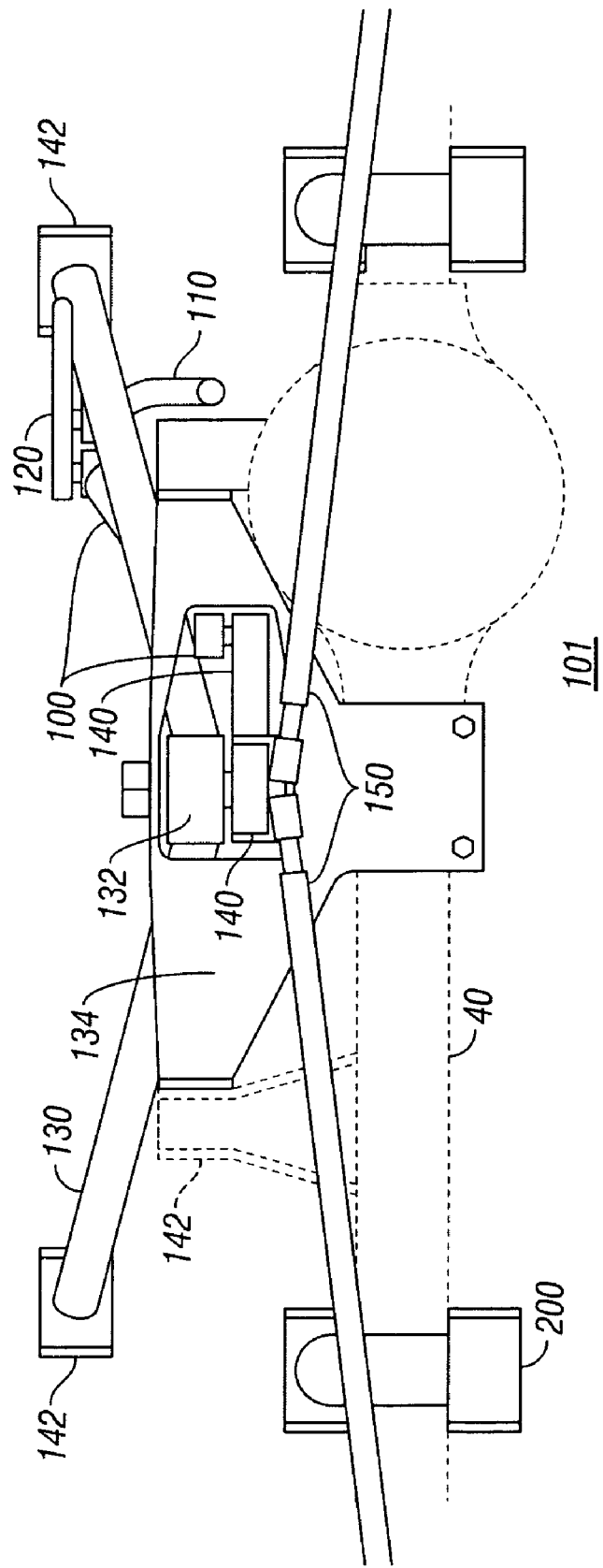
FIG. 4 is an end elevational view of one embodiment of the present invention, wherein the two lower suspension arms are similar to those in the existing design, but there is a single "V"-shaped upper arm called a "wishbone"

FIG. 4 depicts a steering linkage system 101 of the present invention which eliminates the noted problems to which existing steering systems are prone. A steering link (not shown) extends from the pitman arm 110 on the steering box of the vehicle (also not shown) back to a steering idler 120. This steering idler 120 provides a pivot which is substantially coincident with the frame pivot 132 of a wishbone 130, thereby minimizing relative motion between the steering idler 120 and the pitman arm 110 as the wishbone 130 is moved up and down throughout the vehicle's range of suspension travel, from full compression to full extension. A steering drag link 100 extends from the steering idler 120 to a steering bellcrank 140. The pivot of the steering bellcrank 140 is substantially coincident with the axle pivot of wishbone 130; therefore there is no relative motion between steering bellcrank 140 and steering idler 120 as wishbone 130 is moved up and down throughout the vehicle's range of suspension travel. Tie rods 150 extend from steering bellcrank 140 to each of the steering knuckles (not shown). In this manner, there is no relative motion between steering knuckles (not shown) and steering bellcrank 140, as they all attach to axle 40 via the frame pivot 132 and mounting plate 134.

It is not necessary that the steering idler 120 be coupled by a pivot on the wishbone 130. In an alternative embodiment, a sliding idler would be equivalent in result to the pivoted idler 120. This is because the idler is used to transmit motion from pitman arm 110 to the bellcrank 140 via the steering link and steering drag link 100. All that is required is that the idler be unaffected by motion of the wishbone. This result can be accomplished equally well by the idler 120, whether its coupling to the wishbone 130 is by means of a pivot or a slider.

With this system, all relative motion between linkage components is eliminated by making all relative pivot points substantially coincident with one another. Bump-induced toe change and bump-induced steering change are therefore completely eliminated.

This wishbone linkage can attach in one of two ways: two attachment points on the vehicle frame 142 and one attachment point on the axle 40 (as shown in FIG. 4) or reversed, with one attachment point on the frame and two attachment points on the axle. This wishbone linkage may also be located either on the top of the axle (as shown), or on the bottom of the axle utilizing upper suspension arms instead of lower suspension arms. The combination of two suspension arms and one wishbone allows control of the axle location in all axes without any translation due to axle suspension compression and articulation.

Figure 5:
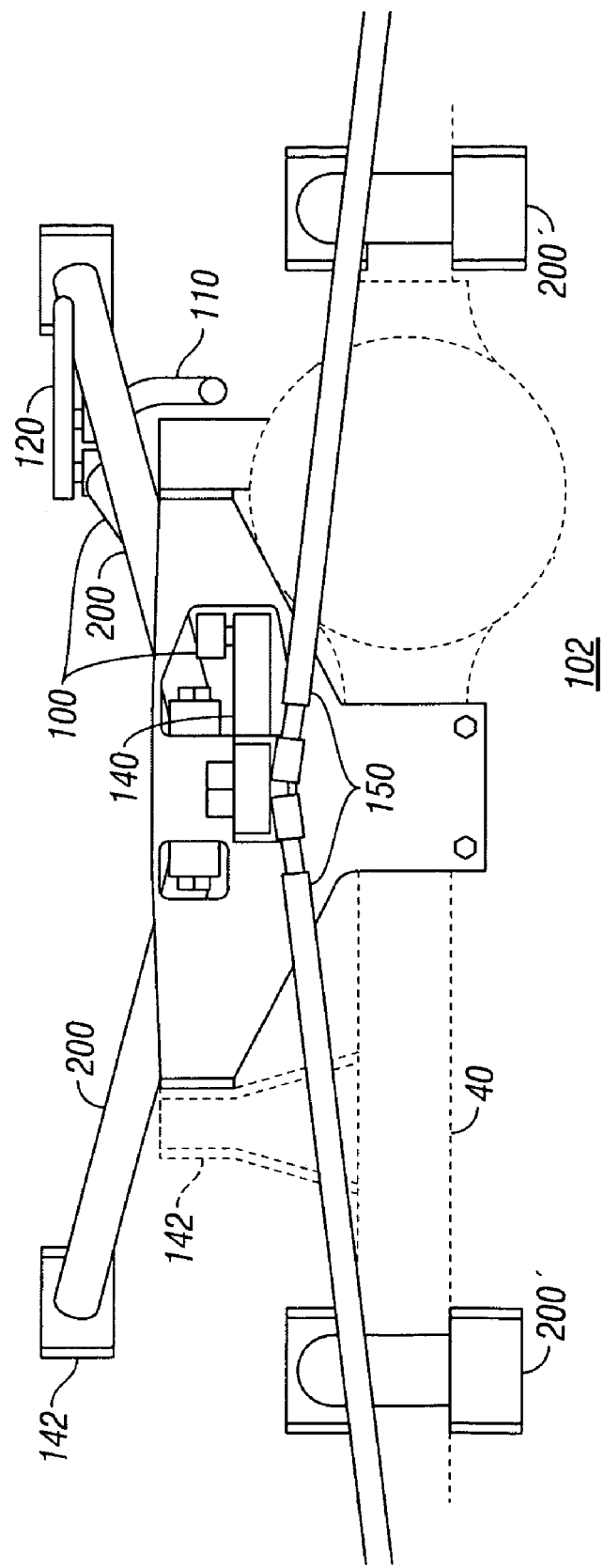
FIG. 5 is an end elevational view of another embodiment of the present invention, wherein the two lower suspension arms are similar to those in the prior art design of FIG. 1, but two independent upper suspension arms are utilized to create an axle-centering feature similar to the wishbone link of FIG. 4.

FIG. 5 illustrates another embodiment 102 of the present invention. Rather than using a single wishbone link, such as the wishbone 130 in FIG. 4, this embodiment incorporates two independent upper suspension arms 200 connected to frame 142. This embodiment could also be deployed as lower suspension arms 200'. By angling suspension arms 200 significantly inward toward axle 40, the suspension arms 200 provide an axle-centering feature similar to the wishbone configuration depicted in FIG. 4. An alternative configuration could have upper suspension arms 200 substantially parallel and lower suspension arms 200' angled in relation to axle 40. The steering linkage is very similar to that in FIG. 4, as the pivots of the steering idler 120 and the steering bellcrank 140 coincide with the pivots of a single suspension link.

Yet another alternative configuration (not shown) involves leaving commonly occurring, stock multi-link setup, such as is shown in FIG. 1 (with two upper suspension arms 10, two lower suspension arms 20, and a track bar 30), but replacing the steering links 50 and 60 with a linkage system similar to that in FIG. 5. Such a configuration would have the pivots coinciding with one of the suspension arms (10 or 20) and the problems with bump-induced toe change and bumpsteer are eliminated, although bump-induced yaw would remain.

Although there have been described hereinabove various specific arrangements of a AUTOMOTIVE STEERING AND SUSPENSION SYSTEM in accordance with the invention for the purpose of illustrating the manner in which the invention may be used to advantage, it will be appreciated that the invention is not limited should be considered to be within the scope of the invention as defined in the annexed claims.

What is claimed is:

1. A suspension and steering system for a wheeled vehicle having a frame suspended above a straight axle, said system comprising:
    a pair of upper suspension arms and a pair of lower suspension arms, each of the lower suspension arms being coupled at an inner end to said axle and at an outer end to said frame;
    at least one of said pairs of suspension arms being attached to said frame at outer ends thereof and angled inwardly to a point where the inner ends are adjacent to one another;
    a mounting plate attached to the axle for coupling to said at least one pair of suspension arms;
    a steering bellcrank pivotably mounted to said mounting plate for rotation about a central pivot axis during steering said vehicle; and
    means for mounting the inner ends of said at least one pair of suspension arms adjacent said central pivot axis of said steering bellcrank.

2. The suspension and steering system of claim 1 wherein said at least one pair of suspension arms is joined together at their inner ends to form a wishbone shape, the inner ends of which are mounted on the central pivot axis of said steering bellcrank.

3. The suspension and steering system of claim 2 wherein said at least one pair of suspension arms forming said wishbone shape is coupled to said mounting plate at the central pivot axis for rotation thereabout.

4. The suspension and steering system of claim 1 wherein at least one pair of suspension arms are angled inwardly and attached to said mounting plate at points adjacent to said central pivot axis.

5. The suspension and steering system of claim 1 further including a steering idler coupled to pitman arm for causing said steering bellcrank to rotate about its pivot axis during steering of the vehicle.

6. The suspension and steering system of claim 5 further including a steering drag link coupled between the steering idler and the steering bellcrank for converting movement of the pitman arm to rotation of said steering bellcrank about its pivot axis.

7. The suspension and steering system of claim 1 wherein said at least one pair of suspension arms form a wishbone whose outer ends are attached to the frame and the remaining pair of suspension arms are coupled from the axle to the frame.

8. The suspension and steering system of claim 1 wherein said at least one pair of suspension arms are attached to the frame at outer ends of said suspension arms and are attached to said mounting plate at points closely adjacent the central pivot axis of the steering bellcrank.

9. A vehicle suspension and steering system for use in conjunction with a wheeled vehicle having a frame supported above a straight axle, said suspension and steering linkage system comprising:
    upper and lower suspension arms each having inner and outer ends connected by pairs between the frame and the axle to permit vertical movement of the axle relative to the frame;
    a mounting plate attached to said axle;
    a steering bellcrank coupled to said mounting plate at a central pivot axis;
    means joining the inner ends of said upper suspension arms together at said pivot axis;
    a steering idler member mounted to convert movement of a pitman arm to rotation of said bellcrank; and
    a steering drag link extending from said steering idler member to said steering bellcrank to cause rotation of said steering bellcrank as the vehicle is steered.

* * * * *